(12) United States Patent
Mikami

(10) Patent No.: US 9,905,260 B2
(45) Date of Patent: Feb. 27, 2018

(54) METHOD FOR MANUFACTURING OPTICAL INFORMATION RECORDING MEDIUM

(71) Applicant: FUJIFILM Corporation, Minato-ku, Tokyo (JP)

(72) Inventor: Tatsuo Mikami, Odawara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 67 days.

(21) Appl. No.: 14/836,359

(22) Filed: Aug. 26, 2015

(65) Prior Publication Data

US 2015/0364153 A1   Dec. 17, 2015

Related U.S. Application Data

(63) Continuation of application No. PCT/JP2014/051304, filed on Jan. 22, 2014.

(30) Foreign Application Priority Data

Feb. 27, 2013   (JP) .................................. 2013-037473

(51) Int. Cl.
  *B29D 11/00*  (2006.01)
  *G11B 7/26*  (2006.01)
  (Continued)

(52) U.S. Cl.
  CPC .......... *G11B 7/263* (2013.01); *B29D 11/0073* (2013.01); *B29D 17/005* (2013.01);
  (Continued)

(58) Field of Classification Search
  CPC ..... B11B 7/263; B29D 17/005; G11B 7/2405; G11B 7/263
  See application file for complete search history.

(56) References Cited

U.S. PATENT DOCUMENTS 9,099,106 B2 * 8/2015 Mochizuki ............ G11B 7/256
2003/0099736 A1 * 5/2003 Anzai ................... B29C 59/026
  425/174.4
(Continued)

FOREIGN PATENT DOCUMENTS

JP    4-372741 A     12/1992
JP    04372741 A   * 12/1992
(Continued)

OTHER PUBLICATIONS

International Search Report for PCT/JP2014/051304 dated Apr. 1, 2014 [PCT/ISA/210].
(Continued)

*Primary Examiner* — William P Bell
(74) *Attorney, Agent, or Firm* — Sughrue Mion, PLLC

(57) ABSTRACT

Method for manufacturing an optical information recording medium includes: preparing a substrate material where a first guide groove has been formed on a first side of the substrate material; forming a second guide groove by applying an energy-curable resin material between a second side of the substrate material opposite to the first side and a stamper and subsequently curing the energy-curable resin material to form a substrate; providing at least one recording layer and a cover layer on a first side of the substrate where the first guide groove has been formed, while holding the substrate with the stamper left unremoved from the substrate to protect the second guide groove; and exposing the second guide groove by removing the stamper and providing at least one recording layer and a cover layer on a second side of the substrate where the second guide groove has been formed.

14 Claims, 6 Drawing Sheets

(51) Int. Cl.
  *G11B 7/245*   (2006.01)
  *G11B 7/246*   (2013.01)
  *B29D 17/00*   (2006.01)
  *G11B 7/24038*   (2013.01)
  *G11B 7/2405*   (2013.01)
  *B29K 69/00*   (2006.01)
  *B29K 101/00*   (2006.01)

(52) U.S. Cl.
  CPC ............ *G11B 7/245* (2013.01); *G11B 7/246* (2013.01); *B29K 2069/00* (2013.01); *B29K 2101/00* (2013.01); *G11B 7/2405* (2013.01); *G11B 7/24038* (2013.01); *G11B 7/266* (2013.01)

(56) References Cited

U.S. PATENT DOCUMENTS

2008/0159116 A1* 7/2008 Kubo .................... G11B 7/266
                                                                            369/275.4
2009/0246712 A1* 10/2009 Sumioka .............. B29D 17/005
                                                                            430/321
2009/0277574 A1* 11/2009 Sugimura ............. B29C 59/022
                                                                            156/247
2014/0120295 A1   5/2014 Mochizuki et al.

FOREIGN PATENT DOCUMENTS

| | | |
|---|---|---|
| JP | 2004-220634 A | 8/2004 |
| JP | 2007-42153 A | 2/2007 |
| JP | 2013-20681 A | 1/2013 |
| WO | WO 2013008529 A1 * | 1/2013 ............. G11B 7/256 |

OTHER PUBLICATIONS

Written Opinion for PCT/JP2014/051304 dated Apr. 1, 2014 [PCT/ISA/237].

Communication dated Jun. 28, 2017, from the State Intellectual Property Office of the P.R.C. in counterpart application No. 201480010679.0.

* cited by examiner

METHOD FOR MANUFACTURING OPTICAL INFORMATION RECORDING MEDIUM

CROSS-REFERENCE TO RELATED APPLICATION(S)

This application is a continuation application of International Application No. PCT/JP2014/051304, filed on Jan. 22, 2014, which claims priority to Japanese Patent Application No. 2013-037473, filed on Feb. 27, 2013, the disclosures of which are incorporated herein by reference in their entireties.

TECHNICAL FIELD

The present invention relates to a method for manufacturing an optical information recording medium comprising a substrate having two surfaces, each of which is formed with a guide groove for tracking, and at least one recording layer provided on each side of the substrate.

BACKGROUND ART

Conventionally, in an optical information recording medium including recording layers provided on both sides of a substrate, a guide groove for tracking may be provided on each side of the substrate so as to perform excellent tracking during the recording and reading information. See, for example, JP 2004-220634 A and JP H04-372741 A.

SUMMARY

However, when a recording layer and other layers are formed on one side of the substrate after the guide grooves are formed on both sides of the substrate as described in these documents, the guide groove formed on the other side of the substrate may be soiled or scratched. Such soling or scratching of the guide groove would cause the other layers such as the recording layer and the intermediate layer to have deficiencies or to create distortion.

In view of the above, it is an object of the present invention to suppress soiling and scratching of the guide groove when the recording layer and other layers are formed after the guide grooves are provided on both sides of the substrate and thus to improve the quality of an optical information recording medium.

In one aspect, there is provided a method for manufacturing an optical information recording medium comprising a substrate having two surfaces, each of which is formed with a guide groove for tracking, at least one recording layer provided on each side of the substrate, and a cover layer provided outside the recording layer on each side of the substrate, the method comprising: a first step of preparing a substrate material in which a first guide groove has been formed on a first side of the substrate material; a second step of forming a second guide groove by applying an energy-curable resin material between a second side of the substrate material opposite to the first side and a stamper having a pattern corresponding to the second guide groove and subsequently curing the energy-curable resin material to form a substrate; a third step of providing at least one recording layer and a cover layer on a first side of the substrate on which the first guide groove has been formed, while holding the substrate with the stamper left unremoved from the substrate to protect the second guide groove; a fourth step of exposing the second guide groove by removing the stamper from the substrate; and a fifth step of providing at least one recording layer and a cover layer on a second side of the substrate on which the second guide groove has been formed.

With the above method, since in the third step the second guide groove is covered by the stamper which can also function as a protecting member, even if at least one recording layer and the cover layer are provided on the first side of the substrate on which the first guide groove has been formed while holding the substrate together with the stamper, the second guide groove is free of soiling and scratching. Accordingly, the quality of the optical information recording medium can be improved by suppressing soiling and scratching of the second guide groove.

Accordingly, it is possible to suppress soiling and scratching of the guide groove when the recording layer and other layers are formed after the guide grooves are provided on both sides of the substrate and thus to improve the quality of the optical information recording medium.

In the method as described above, it is preferable that the first step comprises forming the substrate material with the first guide groove by injection molding.

With this method, the substrate material and the first guide groove can be manufactured at the same time, which can reduce the number of steps and thus improve the production efficiency as compared with the method in which the first guide groove is formed in another step.

In the manufacturing method described above, the third step and the fifth step may comprise providing a plurality of recording layers on each side of the substrate.

The third step and the fifth step of this method may comprise attaching a multi-layer structure sheet comprising a first recording layer, an intermediate layer, a second recording layer and an intermediate layer having adhesiveness in this order.

As described above, if the recording layers are provided by attaching the multi-layer structure sheet, the optical information recording medium can be manufactured with great efficiency.

BRIEF DESCRIPTION OF THE DRAWINGS

FIGS. 5A and 5B explain the manufacturing method according to the exemplary embodiment, in which FIG. 5A is a sectional view showing a step of providing a cover layer on the obverse side, and FIG. 5B is a sectional view showing a step of providing a hard coating layer on the obverse side.

DESCRIPTION OF EMBODIMENT(S)

With reference to the drawings, a method for manufacturing an optical information recording medium according to one exemplary embodiment of the present invention will be described. In the following description, one example of an optical information recording medium manufactured by the manufacturing method of the present invention will be described first, and then the manufacturing method will be described later.

Figure 1:
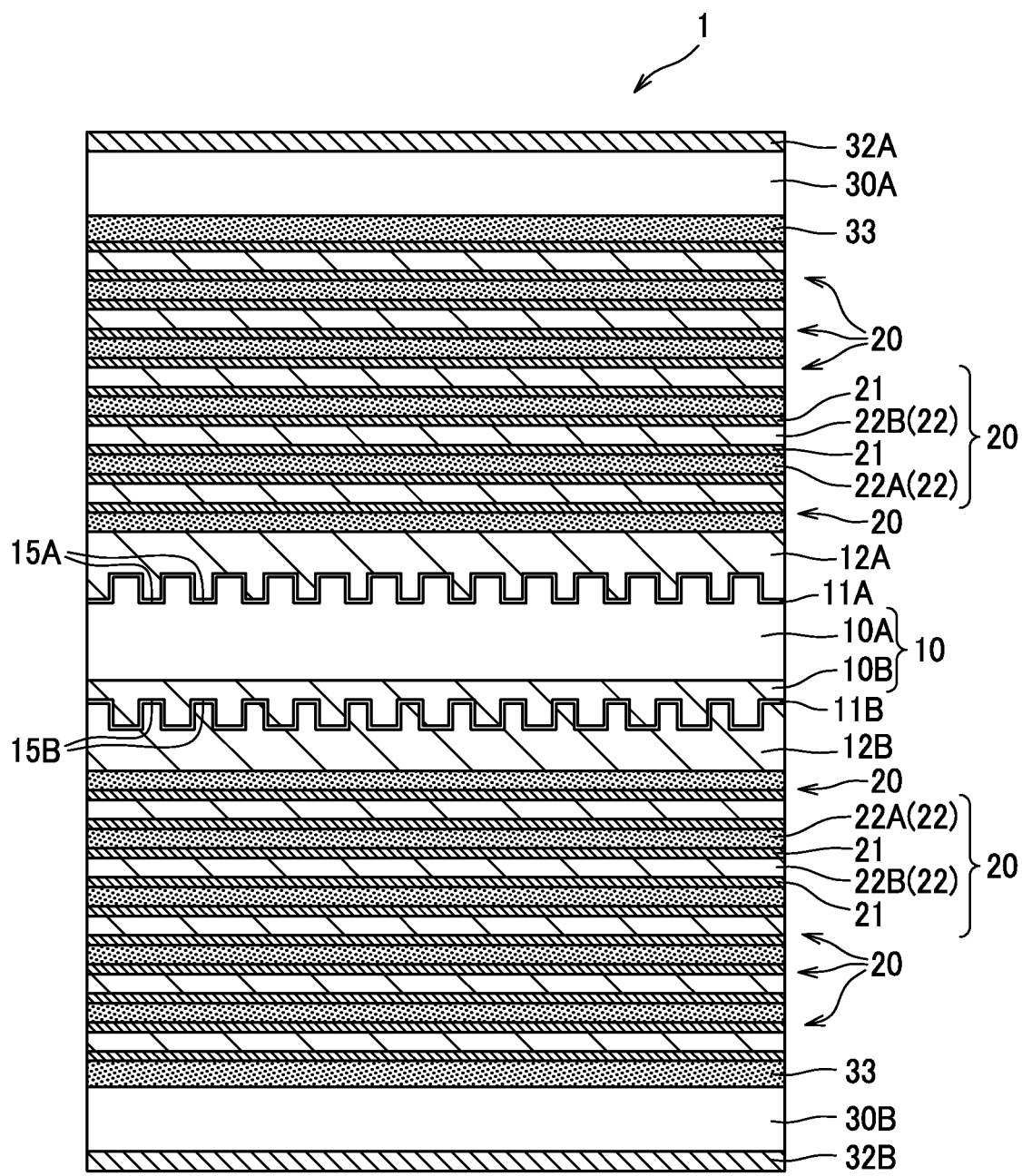
FIG. 1 is a sectional view illustrating an example of an optical information recording medium manufactured by a manufacturing method according to one exemplary embodiment.

As shown in FIG. 1, an optical information recording medium 1 includes a substrate 10 having first and second surfaces, in which a first guide groove 15A and a second guide groove 15B as guide grooves for tracking are respectively formed, a plurality of recording layers 21 provided on each side of the substrate 10, and a cover layer 30A, 30B as a protecting layer provided outside the plurality of recording layers 21 at each side of the substrate 10. To be more specific, a reflective layer 11A, 11B and a spacer layer 12A, 12B are provided on each side of the substrate 10, and a plurality of recording layers 21 and intermediate layers 22 (pressure sensitive adhesive layers 22A and ultraviolet-curable resin layers 22B) disposed between the recording layers 21 are provided on each side outside the spacer layer 12A, 12B. Further, a cover layer 30A, 30B is provided outside the plurality of recording layers 21 through a pressure sensitive adhesive layer 33, and a hard coating layer 32A, 32B is provided outside the cover layer 30A, 30B for the purpose of preventing the cover layer 30A, 30B from being scratched.

<Substrate>

The substrate 10 consists of a substrate material 10A and a guide layer 10B provided on the lower side of the substrate material 10A as shown in FIG. 1.

The substrate material 10A is a supporting member for supporting the recording layers 21 and the intermediate layers 22; the shape, composition and thickness of the substrate material 10A are not limited. As an example, the substrate material 10A is made of a polycarbonate disc. The substrate material 10A has a first guide groove 15A on an upper side (first side) of the substrate material 10A as shown in FIG. 1. The first guide groove 15A is a spiral-shaped groove, for example, and is used for tracking of an optical pickup device when information is recorded in the recording layer 21 located on the upper side of FIG. 1 or when the information is read out from the recording layer 21. In the following description, an upper side of FIG. 1 on which the first guide groove 15A is formed is referred to as an "obverse side" and a lower side of FIG. 1 on which the second guide groove 15B is formed is referred to as a "reverse side".

The guide layer 10B is made of ultraviolet-curable resin as an example of an energy-curable resin, and has the second guide groove 15B formed in the surface opposite from (away from) the substrate material 10A. The second guide groove 15B is used for tracking of the optical pickup device when information is recorded in the recording layer 21 located on the reverse side or when the information is read out from the recording layer 21. The width and depth of the first guide groove 15A and the second guide groove 15B are not limited.

<Reflective Layer>

The reflective layers 11A, 11B are provided respectively on the surface in which the first guide groove 15A is formed and on the surface in which the second guide groove 15B is formed. The reflective layers 11A, 11B are made of metal such as silver and aluminum. The thickness of the reflective layers 11A, 11B is not limited as long as the shapes of the first guide groove 15A and the second guide groove 15B are not lost. The reflective layers 11A, 11B are optionally provided.

<Spacer Layer>

The spacer layers 12A, 12B are provided on the outer surfaces of the reflective layers 11A, 11B. The spacer layer 12A, 12B is a layer for providing a space between the reflective layer 11A, 11B and the recording layer 21 so as to reduce interference of the light reflected from the reflective layer 11A, 11B with the light reflected from a recording interface; by way of example, the spacer layer 12A, 12B is made of ultraviolet-curable resin in this embodiment. The presence and absence of the spacer layers 12A, 12B are optional, and for example, the recording layers 21 may be provided directly on the reflective layers 11A, 11B.

<Recording Layer>

A plurality of recording layers 21 are provided with the intermediate layer 22 disposed between two adjacent recording layers 21; by way of example, 10 recording layers 21 are provided on each of the obverse side and the reverse side of the substrate 10 in this embodiment.

The recording layer 21 is a layer made of a photosensitive material which allows information to be optically recorded therein; in this embodiment, the recording principle of the recording layer 21 as well as the material, thickness and layer structure of the recording layer 21 are not particularly limited. For example, when the recording layer 21 is irradiated with a recording beam, the refractive index, light absorptance, shape or the like of the irradiated spot in the recording layer 21 changes to form a dotted recording mark. As an example, the recording layer 21 in this embodiment is configured to undergo a change in shape when it is irradiated with the recording beam. For this purpose, the recording layer 21 comprises a polymer binder and a dye dispersed in the polymer binder. The recording layer 21 is configured such that irradiation of the recording beam causes the dye to absorb the recording beam and generate heat and that the polymer binder undergoes a change in shape by the generated heat and sticks out into the pressure sensitive adhesive layer 22A to form a protrusion at the interface between the pressure sensitive adhesive layer 22A and the recording layer 21, whereby a recording mark (information) is recorded. To be more specific, the recording mark has a protruding shape of which the center portion has a shape protruding from the recording layer 21 into the pressure sensitive adhesive layer 22A and a recess portion by which the protrusion is surrounded and which is recessed from the pressure sensitive adhesive layer 22A into the recording layer 21; the recess portion has a recess shape (i.e., a recess in the recording layer 21). In this description, the interface of which the shape changes during the recording to form a recording mark is referred to as a "recording interface".

The recording layer 21 is relatively thicker than the conventional recording layer; one recording layer 21 has a thickness in the range of 50 nm to 5 µm, preferably in the range of 100 nm to 3 µm, and more preferably in the range of 200 nm to 2 µm. Although the thickness of the recording layer 21 does not have an upper limit, it is preferable that the thickness thereof is not more than 5 µm in order to provide as many recording layers 21 as possible. It is assumed that the recording layer 21 in this embodiment has a thickness of 1 µm which is taken by way of example.

The number of the recording layers 21 provided on each of the obverse and reverse sides may be approximately in the range of 1 to 100 layers. To increase the storage capacity of the optical information recording medium 1, the more the number of the recording layers 21, the better it may be; for example, it is preferable that ten or more layers are provided. In the case where the recording principle according to this embodiment is adopted, it is preferable that the recording layer 21 is made of a material whose refractive index is substantially unchanged before and after the recording during which the recording interface undergoes a change in shape.

The recording layer 21 may preferably have a recording beam absorption ratio (of one-photon absorption) equal to or less than 10% per one layer. Further, this absorption ratio may be more preferably equal to or less than 2%, and further more preferably equal to or less than 1%. This is because, for example, if the intensity of the recording beam which reaches the deepest recording layer 21 has to be equal to or more than 50% of the intensity of the radiated recording beam, it is necessary that the absorption ratio per one recording layer is equal to or less than 7% in order to obtain ten-layered recording layers, that the absorption ratio per one recording layer is equal to or less than 4% in order to obtain fifteen-layered recording layers, and that the absorption ratio per one recording layer is equal to or less than 2% in order to obtain twenty five-layered recording layers.

The recording layer 21 may be formed by any conventional method; for example, a dye material and a polymer binder are dissolved in a solvent, followed by spin coating or blade coating with the obtained liquid to form a recording layer 21. Examples of the solvent may include dichloromethane, chloroform, methyl ethyl ketone (MEK), acetone, methyl isobutyl ketone (MIBK), toluene, and hexane.

Examples of the polymer binder for use in the recording layer 21 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), polyvinyl alcohol (PVA), polyvinyl benzoate, poly(vinyl pivalate), polyethylacrylate, polybutylacrylate, and the like.

Examples of the recording beam-absorbing dye used for the recording layer 21 may include dyes (one-photon absorption dyes) which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording in and reading from the recording medium having a multiple recording layers, it is preferable that a multi-photon absorption dye is contained as the recording beam-absorbing dye. As an example of the multi-photon-absorption dye, a two-photon absorption compound without having a linear absorption band at the wavelength of the reading beam is preferable. These dyes may preferably be contained in the recording layer in the range of 1 to 80 mass %, more preferably in the range of 5 to 60 mass %, and further more preferably in the range of 10 to 40 mass %.

As long as the two-photon absorption compound has no linear absorption in the wavelength range of the reading beam, any known two-photon absorption compound may be used without limitation; for example, compounds having a structure represented by the following general formula (1) may be used.

General Formula (1)

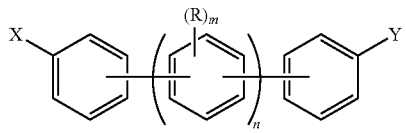

In the general formula (1), X and Y each represent a substituent having a Hammett's sigma-para value (σp value) of 0 or more, which may be the same as or different from each other; n represents an integer of 1 to 4; R represents a substituent, and a plurality of Rs may be the same as or different from each other; and m represents an integer of 0 to 4.

In the general formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n preferably represents an integer of 2 or 3, and most preferably 2. If n is 5 or more, it is said that the greater n becomes, the more the linear absorption appears at the longer wavelength side, so that non-resonant two-photon absorption recording is not done with a recording beam at a wavelength range shorter than 700 nm.

R represents a substituent. The substituent is not particularly limited, and an alkyl group, an alkoxy group, an alkoxyalkyl group, and an aryloxy group are exemplified as specific examples.

The compound having the structure represented by the general formula (1) is not limited to specific examples; the compounds represented by the following chemical structural formulae D-1 to D-21 may be used.

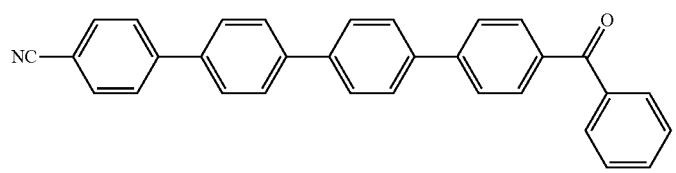
D-1
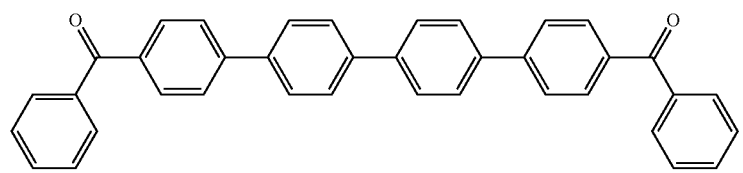
D-2
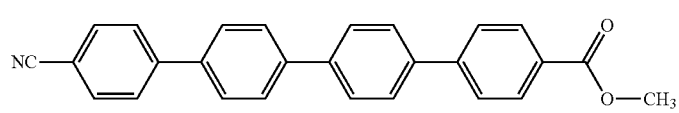
D-3
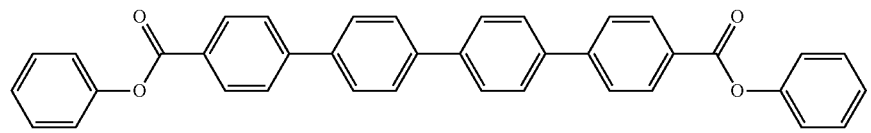
D-4
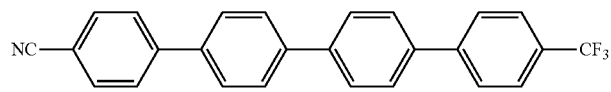
D-5
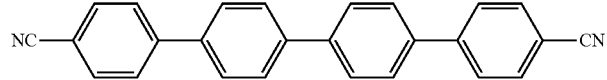
D-6
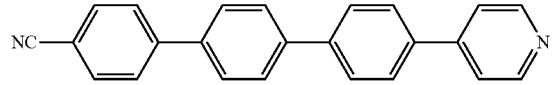
D-7
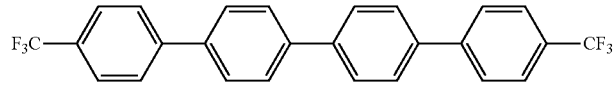
D-8
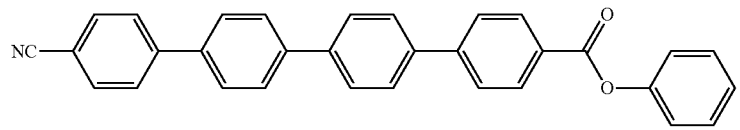
D-9
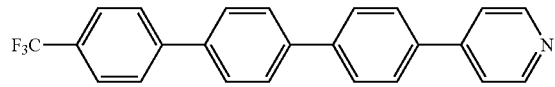
D-10
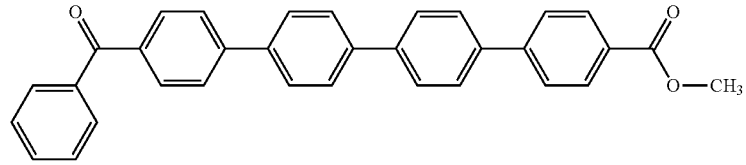
D-11
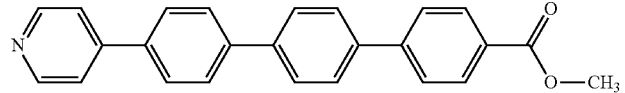
D-12

-continued

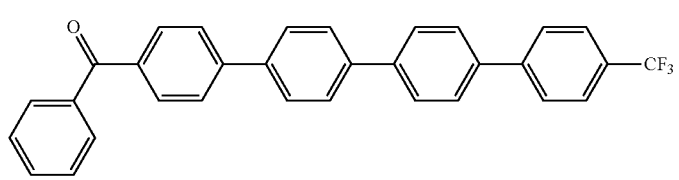
D-13

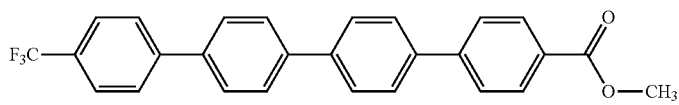
D-14

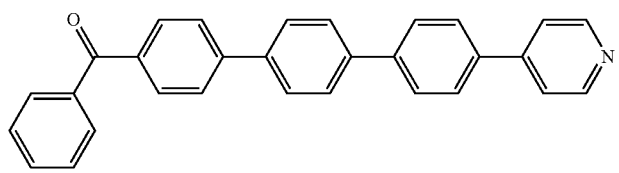
D-15

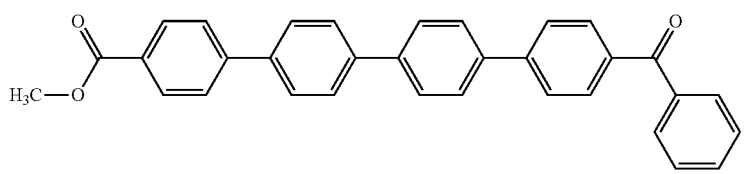
D-16

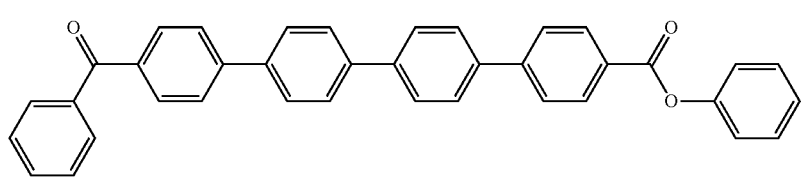
D-17

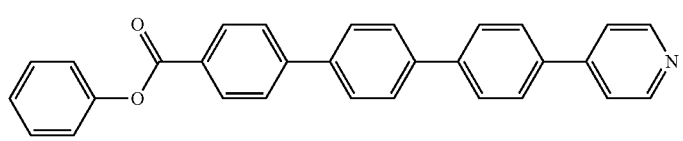
D-18

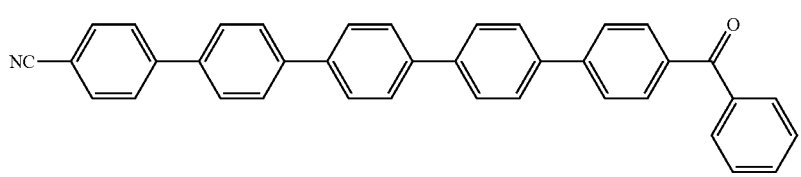
D-19

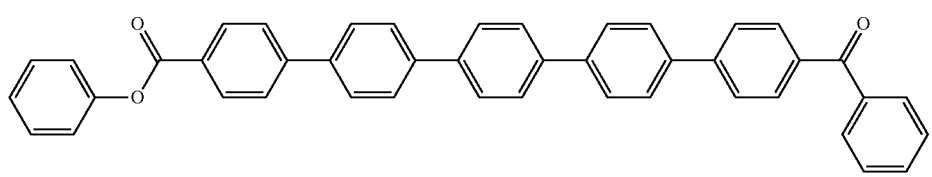
D-20

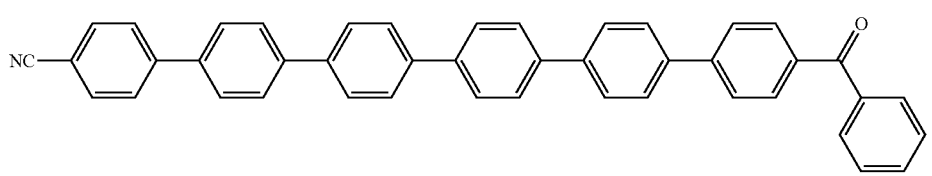
D-21

<Intermediate Layer>

The intermediate layer 22 is disposed between the recording layers 21. In other words, the intermediate layers 22 and the recording layers 21 are arranged alternately. In order to prevent crosstalk across a plurality of recording layers 21 (i.e., phenomenon in which a signal from one recording layer 21 is mixed with another signal from an adjacent recording layer 21), each intermediate layer 22 is provided to form a predetermined amount of space between the adjacent recording layers 21. For this purpose, the thickness of the intermediate layer 22 is equal to or more than 2 μm. The intermediate layer 22 is preferably as thin as possible as long as the inter-layer crosstalk can be prevented; for example, the thickness of the intermediate layer 22 is preferably not more than 20 μm. By way of example, the pressure sensitive adhesive layer 22A and the ultraviolet-curable resin layer 22B are 10 μm thick in this embodiment. In other words, the pressure sensitive adhesive layer 22A and the ultraviolet-curable resin layer 22B in this embodiment have the same thickness. The pressure sensitive adhesive layer 22A and the ultraviolet-curable resin layer 22B thus formed with the same thickness makes the pitches of the recording interfaces not constant, i.e., 12 μm, 10 μm, 12 μm, 10 μm, . . . . This can reduce the likelihood that the interference between a readout beam (i.e., the reflected beam at the recording interface to be generated upon reading information) and a reflected beam of a reading beam (i.e., the reflected beam of the reading beam generated at a recording interface that is adjacent to the reflective interface used for reading the information) affects the readout beam.

One of the pressure sensitive adhesive layer 22A and the ultraviolet-curable resin layer 22B is provided between two adjacent recording layers 21. The pressure sensitive adhesive layer 22A and the ultraviolet-curable resin layer 22B are alternately arranged with one recording layer 21 sandwiched between them. That is, as shown in FIG. 1, a set of layers consisting of the pressure sensitive adhesive layer 22A, the recording layer 21, the ultraviolet-curable resin layer 22B and the recording layer 21 and arranged in this order on the substrate 10 is provided repeatedly. The set of four layers consisting of the recording layer 21, the ultraviolet-curable resin layer 22B, the recording layer 21 and the pressure sensitive adhesive layer 22A is prepared as a multi-layer structure sheet 20 when the optical information recording medium 1 is manufactured.

In the case where the recording principle according to this embodiment is adopted, the pressure sensitive adhesive layer 22A and the ultraviolet-curable resin layer 22B are made of materials which are unreactive to irradiation with a laser beam applied during recording and reading information. Further, in order to minimize the loss of the recording beam, the reading beam, and the readout beam, it is preferable that the pressure sensitive adhesive layer 22A and the ultraviolet-curable resin layer 22B are made of materials which substantially do not absorb (i.e., transparent to) the recording beam, the reading beam, and the readout beam. Herein, the term "transparent" indicates that the absorption ratio thereof is equal to or less than 1%.

It is understood that the pressure sensitive adhesive layer 22A and the ultraviolet-curable resin layer 22B are layers each having a substantially uniformly distributed refractive index.

The pressure sensitive adhesive layer 22A and the ultraviolet-curable resin layer 22B have refractive indices different from each other. The ultraviolet-curable resin layer 22B and the recording layer 21 have substantially the same refractive index. To be more specific, the recording layer 21 and the ultraviolet-curable resin layer 22B have a comparable refractive index such that the following condition is satisfied:

$$((n3-n1)/(n3+n1))^2 \leq 0.0003$$

where n1 represents the refractive index of the recording layer 21, and n3 represents the refractive index of the ultraviolet-curable resin layer 22B; that is, the reflectivity at the interface (non-recording interface) between the ultraviolet-curable resin layer 22B and the recording layer 21 is not more than 0.0003 (0.03%).

To prevent reflection at the non-recording interface, it is preferable that the refractive indices of the recording layer 21 and the ultraviolet-curable resin layer 22B be as close as possible; the difference between the refractive indices of the recording layer 21 and the ultraviolet-curable resin layer 22B is preferably equal to or lower than 0.05, more preferably equal to or lower than 0.03, further more preferably equal to or lower than 0.01, and most preferably 0. As one example, the refractive index n1 of the recording layer 21 is 1.565, and the refractive index n3 of the ultraviolet-curable resin layer 22B is 1.564. In this example, $((n3-n1)/(n3+n1))^2$ is substantially zero.

On the other hand, the pressure sensitive adhesive layer 22A and the recording layer 21 have different refractive indices. To be more specific, it is preferable that the difference between the refractive indices of the pressure sensitive adhesive layer 22A and the recording layer 21 is greater than the difference between the recording layer 21 and the ultraviolet-curable resin layer 22B and not greater than 0.11. To be more specific, the refractive indices of the recording layer 21 and the pressure sensitive adhesive layer 22A may preferably be different to such an extent that the following condition is satisfied:

$$0.0005 \leq ((n2-n1)/(n2+n1))^2 \leq 0.04$$

where n2 represents the refractive index of the pressure sensitive adhesive layer 22A.

If the reflectivity is equal to or greater than 0.0005, the quantity of reflected light derived from the reading beam reflected at the recording interface is so large that a high signal-to-noise ratio during the reading of the information is obtained. If the reflectivity at the recording interface is equal to or smaller than 0.04, the quantity of reflected light derived from the reading beam reflected at the recording interface is restricted to a moderate magnitude, so that the recording beam/reading beam can reach deeper recording layers 21 without undergoing considerable attenuation during the recording/reading of the information. This makes it possible to increase the storage capacity by providing a large number of recording layers 21.

As an example, the refractive index n1 of the recording layer 21 is 1.565, and the refractive index n2 of the pressure sensitive adhesive layer 22A is 1.477. In this instance, $((n2-n1)/(n2+n1))^2$ is 0.0008 (0.08%).

In this embodiment, the pressure sensitive adhesive layer 22A has an adhesive property with which it can be stuck on another surface, and is softer than the recording layer 21. To be more specific, for example, the glass transition temperature of the pressure sensitive adhesive layer 22A is lower than that of the recording layer 21. These configurations can be obtained by appropriately selecting a polymer binder (resin) usable as a material for the recording layer 21 and a resin usable as a material for the pressure sensitive adhesive layer 22A.

According to the above-described configuration in which the pressure sensitive adhesive layer 22A is softer than the recording layer 21, the pressure sensitive adhesive layer 22A is easily deformable by thermal expansion of the recording layer 21 caused by heating with the recording beam so that deformation of the recording interface can be caused to occur with increased ease.

Preferably, the material for the ultraviolet-curable resin layer 22B has a higher hardness, i.e., a higher glass transition temperature, in comparison with that of the pressure sensitive adhesive layer 22A, and the ultraviolet-curable resin layer 22B may be made of a thermoplastic resin or an energy-curable resin. In a case where an energy-curable resin is used, the manufacture of a multi-layer structure sheet 20 can be performed easily because this material can be applied easily to an appropriate thickness and can be cured swiftly. Further, in a case where an energy-curable resin is used, it is preferable that an ultraviolet-curable resin is adopted. By adopting this configuration in which the ultraviolet-curable resin layer 22B is formed of an ultraviolet-curable resin, the ultraviolet-curable resin layer 22B can be produced easily by application of easy-to-handle ultraviolet rays; thus, this configuration is advantageous for manufacturing a large-area multi-layer structure sheet 20.

In this embodiment, the ultraviolet-curable resin layer 22B may have a hardness equal to or higher than that of the recording layer 21. To be more specific, for example, the ultraviolet-curable resin layer 22B may have a glass transition temperature equal to or higher than the glass transition temperature of the recording layer 21. This configuration can be achieved by appropriately selecting a resin usable as the material for the recording layer 21 and a resin usable as the material for the ultraviolet-curable resin layer 22B.

In order to make the difference between the refractive index n1 of the recording layer 21 and the refractive index n3 of the ultraviolet-curable resin layer 22B smaller, preferably equal to 0, the composition of the material for use in the recording layer 21 and the composition of the material for use in the ultraviolet-curable resin layer 22B may be adjusted. To be more specific, since the material for the recording layer 21 in this embodiment contains a polymer binder and a dye such as a two-photon absorption compound dispersed in the polymer binder, the refractive index n1 of the recording layer 21 can be adjusted as desired by appropriately selecting the dye or the polymer binder having an appropriate refractive index and changing their respective composition ratios. The refractive index of the polymer binder varies depending on the degree of polymerization even if they have similar basic constitution. Therefore, the refractive index n1 can also be adjusted by using polymer binders with different degrees of polymerization or by adjusting the degree of polymerization of the polymer binder. Further, the refractive index n1 can be adjusted by mixing different kinds of polymer binders. Further, a refractive index matching material (inorganic particulate and the like) may be added to adjust the refractive index n1.

To adjust the refractive index n3 of the ultraviolet-curable resin layer 22B, the degree of polymerization of the polymer material such as a resin usable as the material for the ultraviolet-curable resin layer 22B may be adjusted. As an alternative, a material usable for the intermediate layer 22 may be optionally added to adjust the refractive index n3, or the adjustment can also be made by adding a refractive index matching material (inorganic particulate and the like).

<Cover Layer>

The cover layer 30A, 30B is a layer provided to protect the recording layers 21 and the intermediate layers 22 (pressure sensitive adhesive layers 22A and ultraviolet-curable resin layers 22B). The cover layer 30A, 30B is made of a material (e.g. polycarbonate) which transmits the recording/readout beam. The cover layer 30A, 30B has an appropriate thickness in the range from several tens micro meters to several millimeters.

Although the optical information recording medium 1 according to this embodiment has been described above, the optical information recording medium may be implemented in an appropriately modified form without limitation to the above-described embodiment. For example, in the above-described embodiment, the thickness of the recording layer 21 is defined as being 50 nm or greater, but the thickness less than 50 nm may also work as well. Furthermore, the above-described embodiment is exemplified such that both of the one-photon absorption dye and the multi-photon absorption dye can be used, but only a specific one-photon absorption dye or multi-photon (e.g., two-photon) absorption dye may be selected for use therein.

In the above-described embodiment, the recording layer 21 is configured to contain a polymer binder and a dye dispersed in the polymer binder, but the present invention is not limited to this configuration; the recording layer 21 may be configured to contain a polymer to which a dye is bonded.

To be more specific, the recording layer 21 may contain a polymer having a structure represented by the following general formula (2).

General Formula (2)

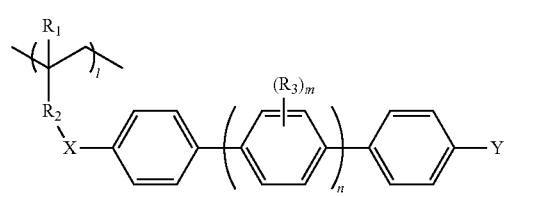

In the general formula (2), Y represents a substituent having a Hammett's sigma-para value (σp value) of 0 or more, X also represents the same kind of substituent. X and Y may be the same as or different from each other. n represents an integer of 1 to 4; $R_1$, $R_2$, $R_3$ represent substituents, which may be the same as or different from each other; l represents an integer not less than one; and m represents an integer of 0 to 4.

<Manufacturing Method>

The method for manufacturing an optical information recording medium 1 as described above will be described.

[Manufacturing Method for a Multi-Layer Structure Sheet]

First, the manufacturing method for a multi-layer structure sheet 20 will be described.

Figure 2A:
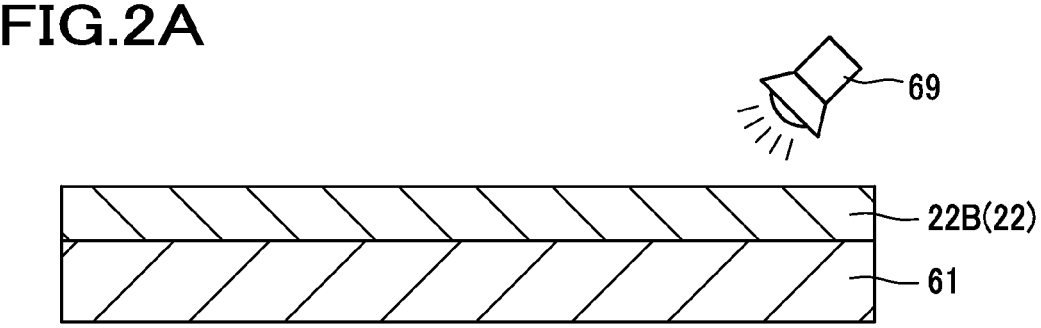
FIGS. 2A to 2D are a series of sectional views explaining a manufacturing method for a multi-layer structure sheet.
Figure 2B:
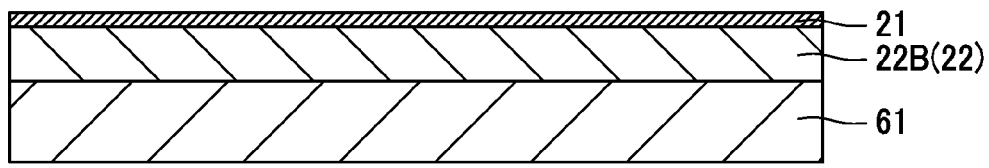
Figure 2C:
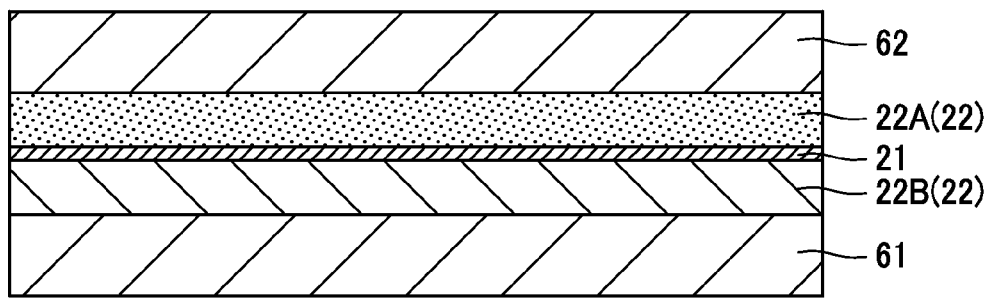
Figure 2D:
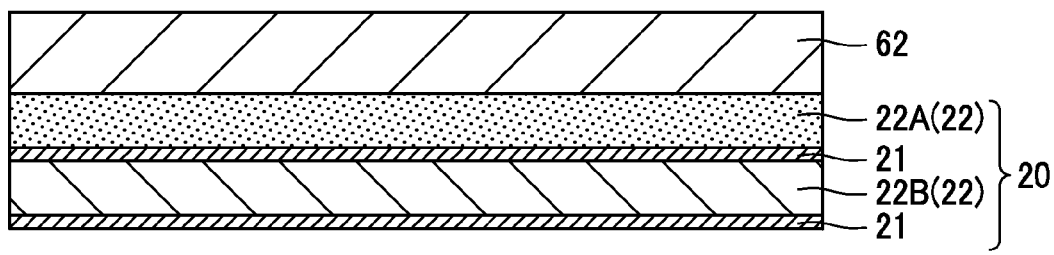

As shown in FIG. 2A, an ultraviolet-curable resin is applied on a release sheet 61 by blade coating or any other coating technique and subsequently cured by irradiation with ultraviolet light using an ultraviolet lamp 69 to thereby form an ultraviolet-curable resin layer 22B. Thereafter, as shown in FIG. 2B, a recording material is applied on the ultraviolet-curable resin layer 22B by blade coating or any other coating technique and subsequently dried to thereby form a recording layer 21. Next, as shown in FIG. 2C, a sheet consisting of a release sheet 62 and a pressure sensitive adhesive layer 22A applied on the release sheet 62 is prepared, and the pressure sensitive adhesive layer 22A is attached to the recording layer 21. Further, as shown in FIG. 2D, a recording material is applied on the ultraviolet-curable resin layer 22B by blade coating or any other coating technique after the release sheet 61 is removed, and then dried to form another recording layer 21. Accordingly, a multi-layer structure sheet 20 supported by the release sheet 62 is manufactured.

[Manufacturing Method for an Optical Information Recording Medium]

Next, the method for manufacturing an optical information recording medium 1 using a multi-layer structure sheet 20 will be described.

Figure 3A:
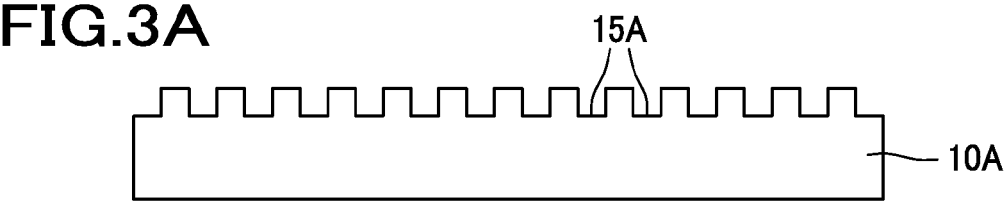
FIGS. 3A to 3D explain a manufacturing method according to one exemplary embodiment and illustrate a series of sectional views showing steps for manufacturing a substrate to which a stamper is attached.

First, as shown in FIG. 3A, a substrate material 10A in which a first guide groove 15A is provided on an obverse side (first side) is formed by injection molding or any other molding method (first step). The substrate material 10A is previously formed, for example, in the shape of a disc with a central circular hole.

Figure 3B:
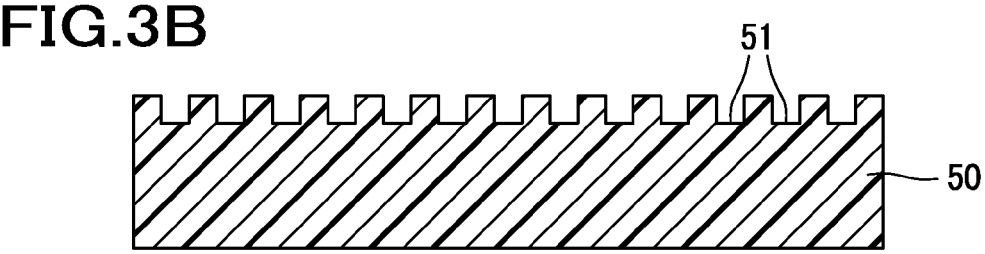

On the other hand, as shown in FIG. 3B, a stamper 50 is prepared; one side of the stamper 50 has an uneven shape 51 corresponding to the reverse pattern of a second guide groove 15B. The stamper 50 may be formed, for example, by injection molding or any other molding method using a resin having an excellent releasing property.

Figure 3C:
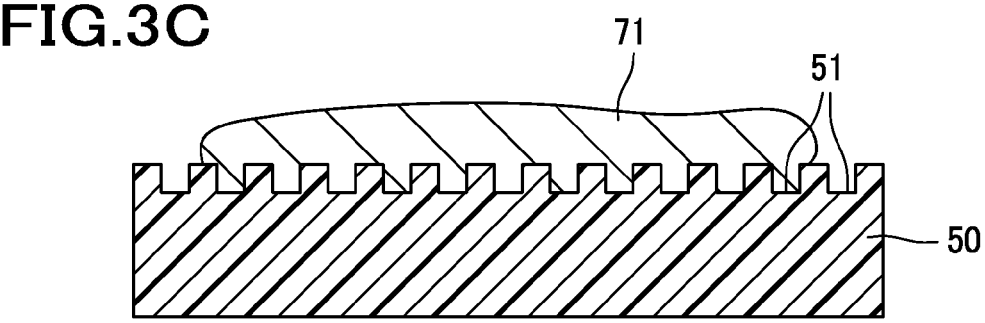
Figure 3D:
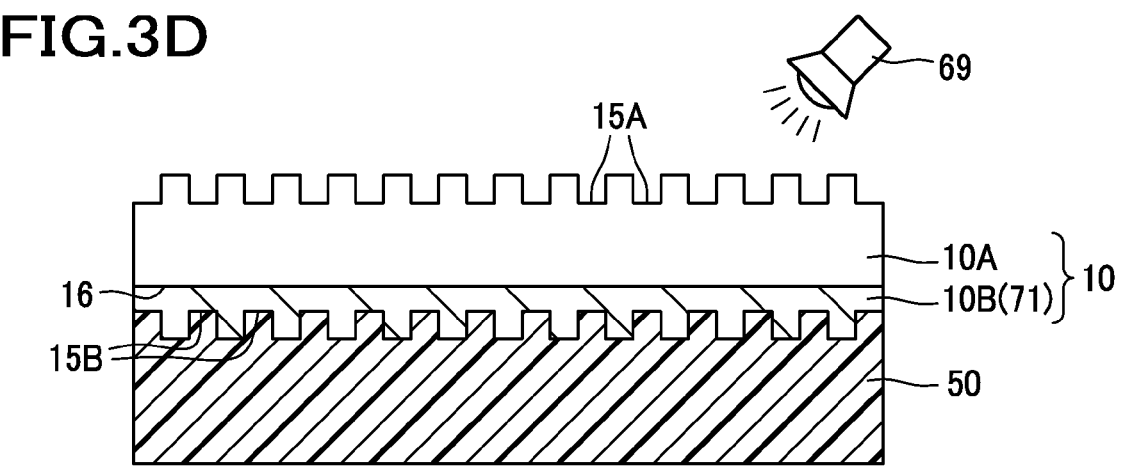

Next, as shown in FIG. 3C, an ultraviolet-curable resin material 71 is dispensed in droplets onto the one side of the stamper 50 on which the uneven shape 51 is formed. Thereafter, as shown in FIG. 3D, a flat surface 16 (i.e., reverse side or second side) of the substrate material 10A is placed on the ultraviolet-curable resin material 71 and rotated, so that a thin layer of the ultraviolet-curable resin material 71 is formed between the substrate material 10A and the stamper 50. In other words, the ultraviolet-curable resin material 71 is provided between the flat surface 16 (i.e., second side opposite to the first side on which the first guide groove 15A is formed and having no guide groove) of the substrate material 10A and the stamper 50. After that, the ultraviolet-curable resin material 71 is irradiated with ultraviolet light using the ultraviolet lamp 69 and cured to thereby form a substrate 10 having a guide layer 10B. The second guide groove 15B is formed on the reverse side of the guide layer 10B (second step). It is noted that at least one of the substrate material 10A and the stamper 50 is made of a material which is transparent to ultraviolet light (energy beam), so that the ultraviolet-curable resin material 71 can be irradiated with ultraviolet light for the purpose of curing.

Next, as shown in FIGS. 4A to 5B, a plurality of recording layers 21 and a cover layer 30A are provided on a first side of the substrate 10 on which the first guide groove 15A has been formed, while holding the substrate 10 with the stamper 50 left unremoved from the substrate 10 to protect (as a protecting member) the second guide groove 15B (third step). The substrate 10 to which the stamper 50 is attached can be held, for example, by vacuum suction of the reverse side of the stamper 50; however, the present invention is not limited to this method, and the outer periphery or the inner periphery of the substrate 10 may be held.

Figure 4A:
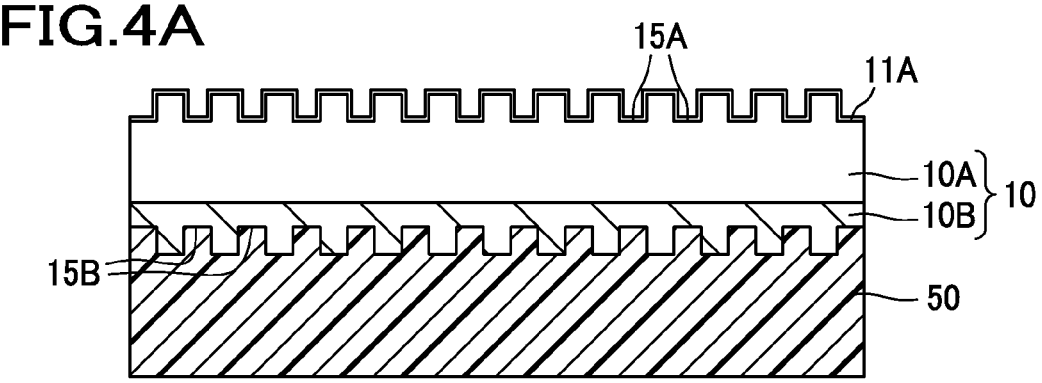
FIG. 4A to 4C explain the manufacturing method according to the exemplary embodiment and illustrate a series of sectional views showing steps for providing a plurality of recording layers on an obverse side.
Figure 4B:
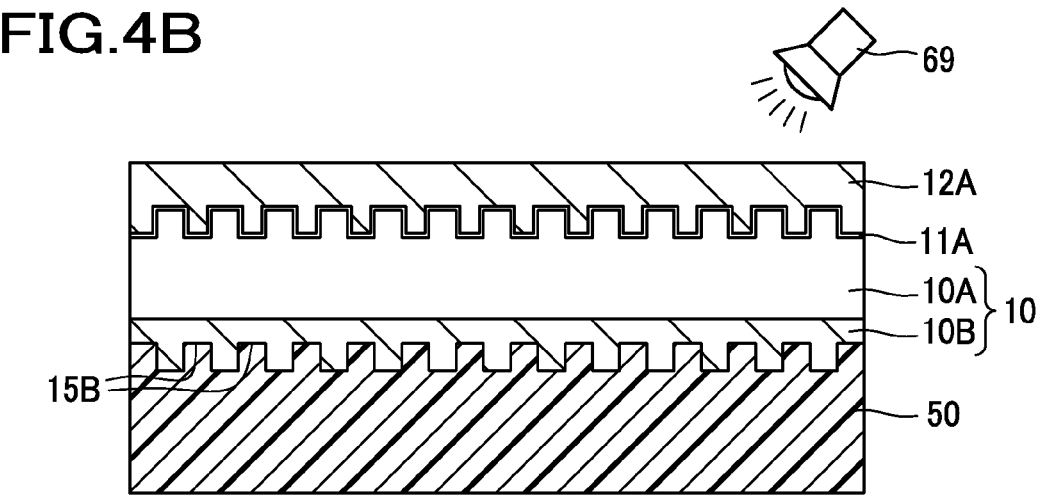

The third step will be specifically described. First, as shown in FIG. 4A, a reflective layer 11A is formed on the first side on which the first guide groove 15A of the substrate 10 has been formed, for example, by sputtering. Subsequently, as shown in FIG. 4B, an ultraviolet-curable resin material is applied on the reflective layer 11A, for example, by spin coating, and the ultraviolet-curable resin material is irradiated with ultraviolet light using the ultraviolet lamp 69 and cured to thereby form a spacer layer 12A.

Figure 4C:
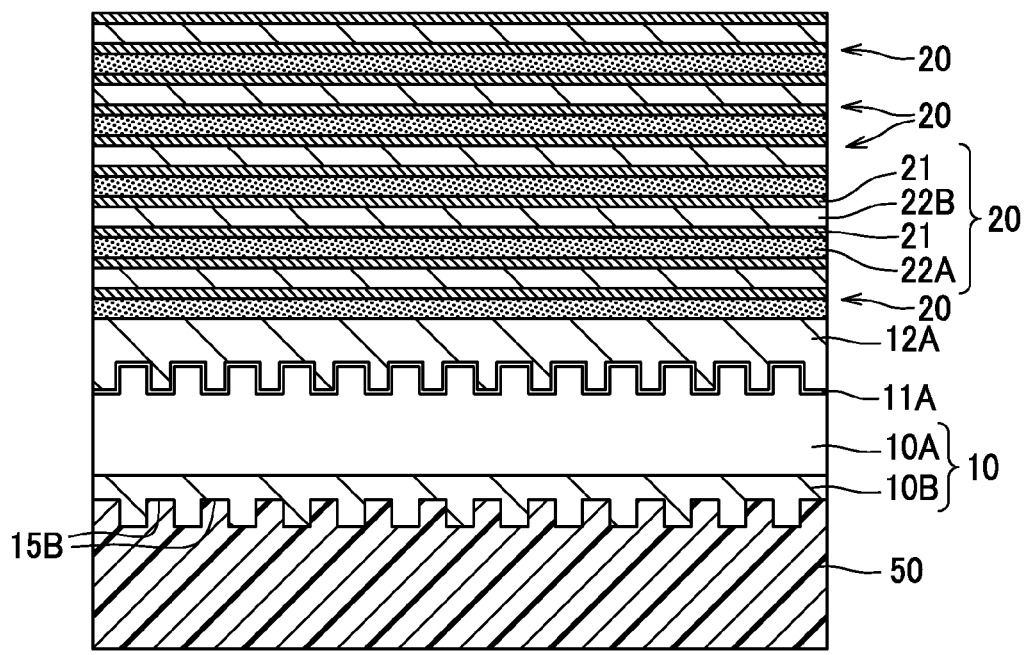

Thereafter, the release sheet 62 is removed from the previously prepared multi-layer structure sheet 20, and as shown in FIG. 4C, the pressure sensitive adhesive layer 22A is placed on and attached to the spacer layer 12A. Further, another multi-layer structure sheet 20 is attached to the already attached multi-layer structure sheet 20, that is, to the outermost recording layer 21 such that the pressure sensitive adhesive layer 22A of the another multi-layer structure sheet 20 is placed on and attached to the outermost recording layer 21; this process is repeated four times. Accordingly, a totally ten-layered recording layers 21 is formed.

Figure 5A:
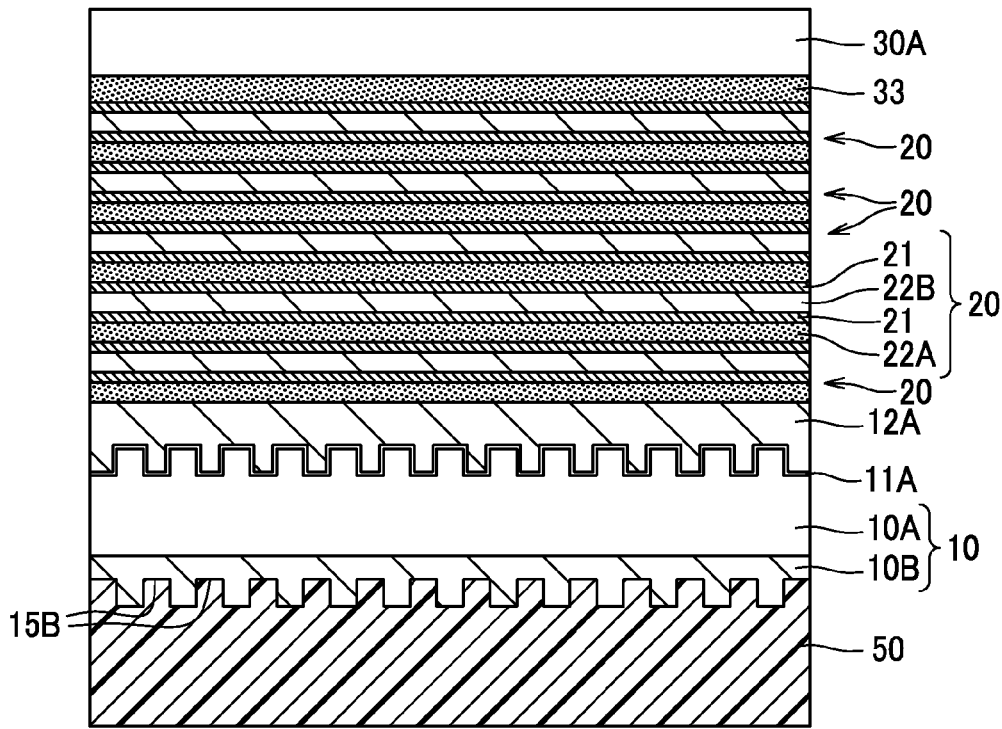
Figure 5B:
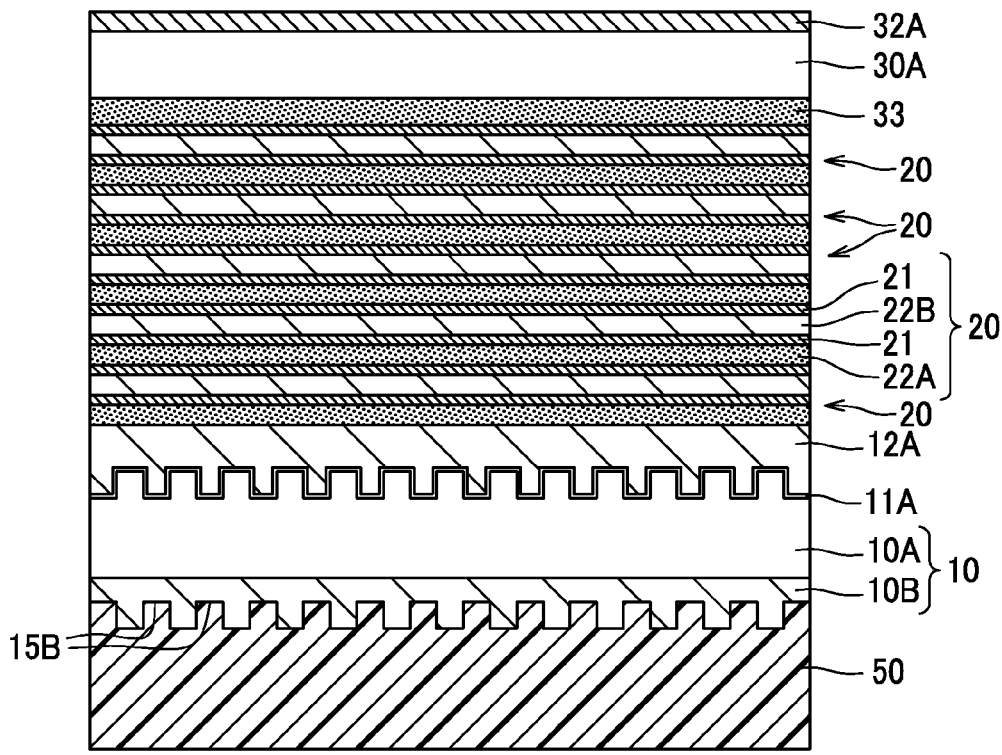

Next, as shown in FIG. 5A, a cover layer 30A provided with a pressure sensitive adhesive layer 33 is prepared, and the cover layer 30A is attached such that the pressure sensitive adhesive layer 33 is placed on and attached to the outermost recording layer 21. After that, as shown in FIG. 5B, a hard coating layer 32A is formed on the cover layer 30A, for example, by spin coating.

Figure 6:
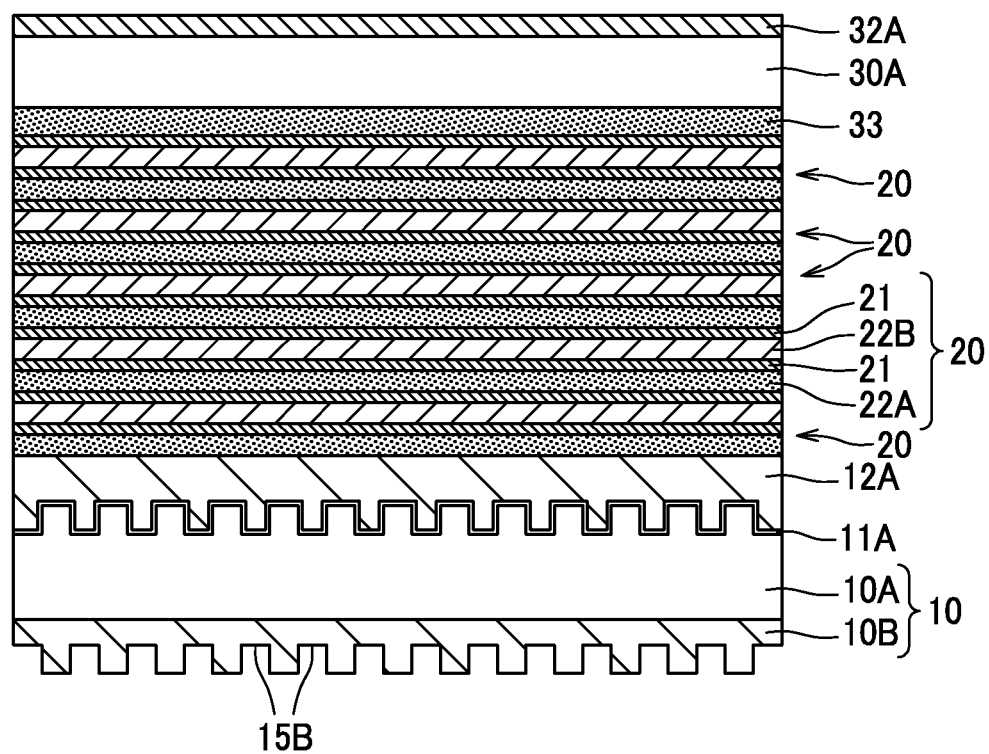
FIG. 6 explains the manufacturing method according to the exemplary embodiment and illustrates a sectional view showing a workpiece from which the stamper has been removed.

Next, as shown in FIG. 6, the stamper 50 is removed to expose the second guide groove 15B (fourth step). Subsequently, while the workpiece is held, for example, by vacuum suction of the hard coating layer 32A, as with the obverse side (first side) of the substrate 10, a reflective layer 11B, a spacer layer 12B, a plurality of recording layers 21 and intermediate layers 22, a cover layer 30B, and a hard coating layer 32B are formed on the reverse side (second side) of substrate 10 on which the second guide groove 15B has been formed (fifth step).

As described above, an optical information recording medium 1 can be manufactured by the manufacturing method according to this embodiment. In this manufacturing method, since the second guide groove 15B is covered and protected in the third step by the stamper 50 which can function as a protecting member, even if the recording layers 21 and the cover layer 30A are formed on the first side of the substrate 10 on which the first guide groove 15A has been formed while holding the substrate 10 to which the stamper 50 is attached, the second guide groove 15B is free of soiling and scratching. Accordingly, soiling and scratching of the second guide groove 15B are suppressed, so that an occurrence of a defect resulting from such soiling or scratching can be suppressed. Therefore, the quality of the optical information recording medium 1 can be improved.

Further, in this manufacturing method, since the substrate material 10A is formed by injection molding and the first guide groove 15A is formed at the same time as the disc-shape of the substrate material 10A is formed, the number of steps can be reduced to improve the production efficiency.

Further, in this manufacturing method, since a plurality of recording layers 21 are provided by attaching the multi-layer structure sheets 20 one on top of another, the optical information recording medium 1 can be manufactured with great efficiency. Especially for an optical information recording medium 1 in this embodiment, in which the recording interface disposed between the recording layer 21 and the intermediate layer 22 undergoes a change in shape, and in which one of the intermediate layers 22 sandwiching the recording layer 21 is made of the pressure sensitive adhesive layer 22A that is a soft layer, a deformation can be performed with ease to facilitate recording.

Although the method for manufacturing the optical information recording medium 1 according to one embodiment of the present invention has been described above, the present invention is not limited to the manufacturing method in the above-described embodiment and various changes and modifications may be made without departing from the scope of the appended claims.

For example, instead of providing a plurality of recording layers 21 on each side of the substrate 10, two recording layers 21 in total may be provided one on each side of the substrate 10. In this instance, it is not necessary to provide an intermediate layer 22.

Further, in the above-described embodiment, the workpiece is held by vacuum suction of the hard coating layer 32A when the plurality of recording layer 21 and the cover layer 30B are provided on the reverse side; however, a protecting layer may be further provided on the hard coating layer 32A and the protecting layer may be held when the recording layers 21 and the cover layer 30B are provided on the reverse side. In this embodiment, the protecting layer is removed after the reverse side is manufactured, so that the finished product can be obtained.

EXAMPLE

Next, description will be given to an example of the method for manufacturing an optical information recording medium according to the present invention. In this example, an optical information recording disc was manufactured by a manufacturing method substantially same as that described in the above embodiment.

[Preparation of a Stamper]

In the example, a stamper was made by injection molding of polycarbonate; the stamper has one surface provided with an uneven shape corresponding to the reverse pattern of the second guide groove. To improve the releasabililty of the uneven-shaped surface, a 10-nm-thick layer of Ag-alloy GD02 (manufactured by Kobelco Research Institute, Inc.) was deposited on the uneven-shaped surface using a sputtering system. The stamper was formed into a circular disc having a thickness of 0.8 mm and a diameter of 120 mm.

[Preparation of an Ultraviolet-Curable Resin Material]

The following materials were mixed by stirring for 5 hours to prepare an ultraviolet-curable resin material:
Acrylic resin EA-F5003 (manufactured by Osaka Gas Chemicals Co., Ltd.)
  79 parts by mass
Acrylic resin M-310 (manufactured by Toagosei Co., Ltd.)
  21 parts by mass
Photo-polymerization initiator IRGACURE184 (manufactured by Ciba AG)
  3 parts by mass

[Preparation of a Multi-Layer Structure Sheet]

The ultraviolet-curable resin material was applied on a release film HY-NS80 (manufactured by Higashiyama Film Co., Ltd.) by blade coating, followed by irradiation with ultraviolet light using a high-pressure UV lamp UM-102 (manufactured by Ushio Inc.), to thereby form an ultraviolet-curable resin layer as an intermediate layer. The thickness of the ultraviolet-curable resin layer measured by a Stylus profilometer DektakXT (available from Ulvac Equipment Sales, Inc.) was 10 μm.

The following materials were mixed by stirring for 20 hours to prepare a recording layer coating liquid:
Polymer binder: Polymethylmethacrylate (manufactured by SIGMA-ALDRICH Corporation)
  63 parts by mass
Light absorption material: 2,2',4,4'-Tetrahydroxybenzophenone (manufactured by SIGMA-ALDRICH Corporation)
  37 parts by mass
Solution: 2-butanone (manufacture by Wako Pure Chemical Industries, Ltd.)
  2200 parts by mass The obtained recording layer coating liquid was applied on the ultraviolet-curable resin layer by blade coating, followed by drying in an oven for 3 minutes at 100° C. The film thickness of the recording layer was 0.4 μm.

After the light peel strength release film was peeled off from an adhesive sheet DA-3010 (manufactured by Hitachi Chemical Co., Ltd.) having a thickness of 10 μm, it was bonded to the above-described recording layer using a laminator RSL-382S (manufactured by Japan office laminator Co., Ltd.). The release film in contact with the ultraviolet-curable resin layer was peeled off and the recording layer coating liquid was applied on the ultraviolet-curable resin layer by blade coating, followed by drying in the oven for 3 minutes at 100° C. The film thickness of the recording layer was 0.4 μm. The obtained multi-layer structure sheet (see FIG. 2D) was cut into a disc shape.

[Preparation of a Cover Sheet]

A polycarbonate film (manufactured by Teijin Chemicals Ltd.) and an adhesive sheet DA-3010 was bonded together using the laminator RSL-382S (manufactured by Japan office laminator Co., Ltd.), followed by cutting into a disc shape to prepare a cover sheet as a cover layer.

[Preparation of an Optical Information Recording Disc]

A substrate made of polycarbonate and having a thickness of 0.8 mm and a diameter of 120 mm was formed by injection molding; a guide groove (first guide groove) was provided on a first side (one side) of the substrate. The stamper was placed on a spin coater with the first side (uneven-shaped surface) facing up, 1 g of the ultraviolet-curable resin material was added dropwise (see FIG. 3C), and the substrate was laid on the ultraviolet-curable resin material with a second side of the substrate (opposite to the first side and having no guide groove) facing down (see FIG. 3D). The workpiece was rotated for 30 seconds at 5,000 rpm for the spin coating process of the ultraviolet-curable resin material and subsequently irradiated with a xenon flash lamp for 1 second to cure the ultraviolet-curable resin material.

Next, a 10-nm-thick layer of Ag-alloy GD02 was deposited on the first side of the substrate on which the first guide groove has been formed, using a sputtering system, to thereby form a reflective layer. 1 g of the ultraviolet-curable resin material was added dropwise on the reflective layer, followed by spin coating for 20 seconds at 2,000 rpm. After that, the workpiece was irradiated with the xenon flash lamp for 1 second to form a spacer layer (see FIG. 4B).

Next, a high peel strength release film at the pressure sensitive adhesive layer side of the multi-layer structure sheet was peeled off from the multi-layer structure sheet and bonded to the spacer. This process was repeated 5 times (see FIG. 4C). The high peel strength release film was peeled off from the adhesive sheet of the cover sheet, and the cover sheet was bonded to the multi-layer structure sheet (see FIG. 5A). 1 g of a hard coat material SK1100 (manufactured by Dexerials Corporation) was added dropwise on the cover layer, followed by spin coating for 10 seconds at 3,000 rpm. After that, the workpiece was irradiated with the xenon flash lamp for 1 second to form a hard coating layer (see FIG. 5B).

After the stamper was removed (see FIG. 6), a reflective layer, recording layers, intermediate layers, a cover layer and a hard coating layer were formed on the guide layer in the same manner as described above to provide an optical information recording disc (see FIG. 1).

The finished optical information recording disc was observed by an optical microscope, and a defect with a length of 100 μm or more was not found.

Comparative Example

[Preparation of an Optical Information Recording Disc]

A substrate made of polycarbonate and having a thickness of 0.8 mm and a diameter of 120 mm was formed by injection molding; a guide groove (first guide groove) was provided on a first side (one side) of the substrate. The stamper was placed on a spin coater with the first side (uneven-shaped surface) facing up, 1 g of the ultraviolet-curable resin material was added dropwise (see FIG. 3C), and the substrate was laid on the ultraviolet-curable resin material with a second side of the substrate (opposite to the first side and having no guide groove) facing down (see FIG. 3D). The workpiece was rotated for 30 seconds at 5,000 rpm for the spin coating process of the ultraviolet-curable resin material and subsequently irradiated with the xenon flash lamp for 1 second to cure the ultraviolet-curable resin material. The stamper was removed and the second guide groove was exposed to view.

After that, as with the above example, a reflective layer, a spacer layer, recording layers and intermediate layers, a cover layer and a hard coating layer were formed on the first side of the substrate on which the first guide groove had been formed, and further a reflective layer, a spacer layer, recording layers and intermediate layers, a cover layer and a hard coating layer were formed on the second side of the substrate on which the second guide groove had been formed.

The finished optical information recording disc was observed by the optical microscope, and five defects (with a length of 100 μm or more) were found.

What is claimed is:

1. A method for manufacturing an optical information recording medium comprising:
    a first step of forming a substrate material by injection molding, wherein the substrate material has a first guide groove for tracking on a first side of the substrate material, the substrate material being formed as a single layer;
    a second step of forming a second guide groove for tracking by applying an energy-curable resin material between a second side of the substrate material opposite to the first side and a stamper having a pattern corresponding to the second guide groove and subsequently curing the energy-curable resin material by irradiation with energy beam through the substrate material to form a substrate;
    a third step of providing at least one recording layer and a cover layer on a first side of the substrate on which the first guide groove has been formed, while holding the substrate with the stamper left unremoved from the substrate to protect the second guide groove, followed by removing the stamper from the substrate to expose the second guide groove; and
    a fourth step of providing at least one recording layer and a cover layer on a second side of the substrate on which the second guide groove has been formed.

2. The method according to claim 1, wherein in the third step, a first spacer layer having a flat surface is formed on the first guide groove to close the first guide groove, and
    wherein in the fourth step, a second spacer layer having a flat surface is formed on the second guide groove to close the second guide groove.

3. The method according to claim 2, wherein the first spacer layer and the second spacer layer are formed by spin coating of an energy-curable resin material, followed by irradiation with energy beam.

4. The method according to claim 2, wherein in the third step, a plurality of recording layers and a plurality of intermediate layers are formed on the first side of the substrate, the first guide groove being used for tracking the plurality of recording layers on the first side, and
    wherein in the fourth step, a plurality of recording layers and a plurality of intermediate layers are formed on the second side of the substrate, the second guide groove being used for tracking the plurality of recording layers on the second side.

5. The method according to claim 4, wherein the third step and the fourth step comprise attaching a multi-layer structure sheet on the flat surface of the first spacer layer and on the flat surface of the second spacer layer, respectively, the multi-layer structure sheet comprising a first recording layer, an intermediate layer, a second recording layer and an intermediate layer having adhesiveness in this order.

6. The method according to claim 5, wherein the first recording layer, the second recording layer and the intermediate layers are formed as flat layers.

7. The method according to claim 1, wherein in the third step, a first reflective layer is formed on the first guide groove, and
    wherein in the fourth step, a second reflective layer is formed on the second guide groove.

8. The method according to claim 7, wherein in the third step, a first spacer layer having a flat surface is formed on the first reflective layer to close the first guide groove and the first reflective layer, and
    wherein in the fourth step, a second spacer layer having a flat surface is formed on the second reflective layer to close the second guide groove and the second reflective layer.

9. The method according to claim 8, wherein the first spacer layer and the second spacer layer are formed by spin coating of an energy-curable resin material, followed by irradiation with energy beam.

10. The method according to claim 8, wherein in the third step, a plurality of recording layers and a plurality of intermediate layers are formed on the first side of the substrate, the first guide groove being used for tracking the plurality of recording layers on the first side, and
    wherein in the fourth step, a plurality of recording layers and a plurality of intermediate layers are formed on the second side of the substrate, the second guide groove being used for tracking the plurality of recording layers on the second side.

11. The method according to claim 10, wherein the third step and the fourth step comprise attaching a multi-layer structure sheet on the flat surface of the first spacer layer and on the flat surface of the second spacer layer, respectively, the multi-layer structure sheet comprising a first recording layer, an intermediate layer, a second recording layer and an intermediate layer having adhesiveness in this order.

12. The method according to claim 11, wherein the first recording layer, the second recording layer and the intermediate layers are formed as flat layers.

13. The method according to claim 7, wherein the first reflective layer and the second reflective layer are formed by sputtering.

14. The method according to claim 1, wherein in the third step, a plurality of recording layers and a plurality of intermediate layers are formed on the first side of the substrate, the first guide groove being used for tracking the plurality of recording layers on the first side, and
    wherein in the fourth step, a plurality of recording layers and a plurality of intermediate layers are formed on the second side of the substrate, the second guide groove being used for tracking the plurality of recording layers on the second side.

* * * * *